(12) United States Patent
Zheng et al.

(10) Patent No.: US 11,698,187 B1
(45) Date of Patent: Jul. 11, 2023

(54) PATTERN PROJECTING APPARATUS FOR AUTOMATICALLY IDENTIFYING AND PLAYING AUDIO

(71) Applicant: Shenzhen Bolong Technology Co. Ltd., Shenzhen (CN)

(72) Inventors: Huazhu Zheng, Shenzhen (CN); Yunyun Lu, Shenzhen (CN); Caijian Zheng, Shenzhen (CN); Wenzhen Ouyang, Shenzhen (CN)

( * ) Notice: Subject to any disclaimer, the term of this patent is extended or adjusted under 35 U.S.C. 154(b) by 0 days.

(21) Appl. No.: 18/169,810

(22) Filed: Feb. 15, 2023

(30) Foreign Application Priority Data

Jan. 7, 2023 (CN) .......................... 202320058440.7

(51) Int. Cl.
*F21V 33/00* (2006.01)
*G06K 7/10* (2006.01)
*F21V 3/04* (2018.01)
*F21V 23/04* (2006.01)

(52) U.S. Cl.
CPC ............ *F21V 33/0056* (2013.01); *F21V 3/04* (2013.01); *F21V 23/0442* (2013.01); *G06K 7/10237* (2013.01)

(58) Field of Classification Search
CPC .... F21V 33/0056; F21V 3/04; F21V 23/0442; G06K 7/10237
See application file for complete search history.

(56) References Cited

U.S. PATENT DOCUMENTS

| 5,517,264 | A  | * | 5/1996  | Sutton | F21S 8/035 |
| | | | | | 353/71 |
| 10,830,410 | B1 | * | 11/2020 | Wei | F21V 23/02 |
| 11,156,352 | B1 | * | 10/2021 | Li | H04R 3/00 |
| 11,221,117 | B1 | * | 1/2022  | Xu | F21V 14/04 |

(Continued)

FOREIGN PATENT DOCUMENTS

| CN | 112540501 A | 3/2021 |
| CN | 214504111 U | 10/2021 |

(Continued)

*Primary Examiner* — Zheng Song (57) ABSTRACT

The utility model discloses a pattern projecting apparatus for automatically identifying and playing an audio. The projecting apparatus includes a first housing, a light-emitting assembly, a film assembly, an audio assembly, and an imaging assembly. The audio assembly includes a control board, an electronic label corresponding to a film sheet, an identifying module for identifying the electronic label and arranged on the control board, a storage medium pre-stored with an audio corresponding to a galactic starry sky pattern, and a speaker electrically connected to the control board. The electronic label is arranged on the film assembly. When the film assembly is mounted in a first mounting hole, the identifying module identifies the electronic label on the film sheet, positions the audio corresponding to the electronic label in the storage medium and plays the audio via the speaker, so that the galactic starry sky pattern projected by the projecting apparatus is played in combination with the audio. A user can hear an audio corresponding to a pattern of the film sheet when changing different film sheets.

(Continued)

Therefore, the user's experience is effectively improved, and the practicability of the projecting apparatus is enhanced.

16 Claims, 5 Drawing Sheets

(56) References Cited

U.S. PATENT DOCUMENTS

| | | |
|---|---|---|
| 2003/0029918 A1 | 2/2003 | Leanheart et al. |
| 2003/0170603 A1 | 9/2003 | Chen et al. |
| 2005/0174777 A1* | 8/2005 | Cooper .................. H05B 47/19 362/276 |
| 2016/0061438 A1 | 3/2016 | Lu |
| 2023/0041557 A1* | 2/2023 | Lee ..................... A61J 17/1012 |

FOREIGN PATENT DOCUMENTS

| | | |
|---|---|---|
| CN | 215416243 U | 1/2022 |
| CN | 217405005 U | 9/2022 |
| EP | 1389030 A2 | 2/2004 |
| EP | 4050900 A1 | 8/2022 |
| JP | 2016057625 A | 4/2016 |

\* cited by examiner

PATTERN PROJECTING APPARATUS FOR AUTOMATICALLY IDENTIFYING AND PLAYING AUDIO

TECHNICAL FIELD

The utility model relates to the technical field of projection, and particularly to a pattern projecting apparatus for automatically identifying and playing an audio.

TECHNICAL BACKGROUND

With the development of the times, people's quality of life is improving. A projecting lamp, as an electrical device that can project an image or a text onto the ground or a wall, is more widely used in daily life in a stage, a bedroom, a vapor lamp and other places. However, the main R&D direction of a projecting lamp in the prior art lies in how to diversify a pattern, which leads to a very single function of the projecting lamp.

SUMMARY

A main objective of the utility model is to propose a pattern projecting apparatus for automatically identifying and playing an audio, aiming to improve the practicality of the projecting apparatus.

To achieve the above objective, the utility model proposes a pattern projecting apparatus for automatically identifying and playing an audio, including:

a first housing opened and provided with a first mounting hole;

a light-emitting assembly arranged within the first housing, the light-emitting assembly includes at least one first incoherent light source and at least one first condensing lens, and the first condensing lens is arranged on an illuminating surface of the first incoherent light source;

a film assembly detachably arranged within the first mounting hole, the film assembly includes a film sheet provided with a galactic starry sky pattern, and the film sheet is arranged on the other side of the first condensing lens relative to the first incoherent light source;

an audio assembly including a control board, an electronic label corresponding to the film sheet, an identifying module for identifying the electronic label and arranged on the control board, a storage medium pre-stored with an audio corresponding to a galactic starry pattern and a speaker electrically connected to the control board, the electronic label is arranged on the film assembly, the control board, the storage medium, and the speaker are arranged within the first housing; and an imaging assembly arranged in the first housing and including at least one lens, the lens is arranged on the other side of the film sheet relative to the first condensing lens.

Optionally, the electronic label is an RFID label. The identifying module includes an RFID chip.

Optionally, the film assembly includes a second housing and a film tray. The film sheet is arranged on the film tray. The position of the second housing corresponding to the first mounting hole is fixed in the first housing. The film tray is inserted and provided in the first mounting hole and extends into the second housing.

Optionally, the control board is fixed at the bottom of the second housing.

Optionally, the film assembly further includes a rotating board and a pressing board. The rotating board is opened and provided with a fixing groove. The film sheet and the pressing board are fixedly arranged in the fixing groove. The rotating board and the pressing board are made of a transparent material. The film tray is opened and provided thereon with a mounting groove. The rotating board is arranged in the mounting groove.

Optionally, the electronic label is provided as an annular shape. The rotating board is opened and provided with an annular groove. The electronic label is arranged within the annular groove. The film sheet is positioned in the middle of the electronic label.

Optionally, the projecting apparatus further includes a first driving assembly arranged in the first housing. The first driving assembly includes a motor, a fixing board, and a gear set. The fixing board is fixed in the first housing. The motor is fixed on the fixing board. The sidewall of the rotating board is arranged in a tooth shape meshing with the gear set so that the motor drives the rotating board via the gear set to rotate.

Optionally, the first driving assembly is arranged below the first incoherent light source. The first driving assembly further includes a rotating shaft of which one end is fixed on the fixing board and of which the other end is fixed on the second housing. The gear set includes a driving gear arranged on a motor shaft of the motor, a first transmission gear sleeved on a fixing column and meshed with the driving gear, and a second transmission gear sleeved on the fixing column and fixedly connected to the first transmission gear. The second transmission gear is meshed with the rotating board. The second transmission gear has the number of teeth less than that of the first transmission gear.

Optionally, the second housing includes an upper housing and a lower housing. The film tray and the lower housing are opened and provided with a position-avoidance groove for avoiding a position of the second transmission gear. The fixing column passes through the position-avoidance groove and is fixed on the upper housing.

The bottom wall of the mounting groove is provided with a limiting ring correspondingly provided with the annular groove.

Optionally, an imaging assembly includes an imaging lens, an adjusting lens, and a wide-angle lens arranged sequentially in a projecting direction of the film sheet, respectively.

Optionally, the imaging assembly includes a first sleeve tube. The imaging lens, the adjusting lens, and the wide-angle lens are arranged within the first sleeve tube.

Optionally, the light-emitting assembly further includes a second condensing lens. The second condensing lens is arranged on the other side of the first condensing lens relative to the first incoherent light source.

Optionally, the light-emitting assembly further includes a second sleeve tube. The second sleeve tube is sleeved on the first incoherent light source. The first condensing lens and the second condensing lens are arranged within the second sleeve tube.

Optionally, the first incoherent light source, the first condensing lens, the film sheet, and the imaging assembly are arranged coaxially.

Optionally, the electronic label is an NFC label. The identifying module includes an NFC chip.

Optionally, the projecting apparatus further includes a laser assembly. The laser assembly includes at least one coherent light source, at least one diffraction medium, and a second driving assembly for driving the diffraction medium to rotate. The diffraction medium is arranged on the illuminating surface of the coherent light source.

Based on the technical solution of the utility model, the light-emitting assembly is arranged in the first housing. The first housing is opened and provided thereon with a first mounting hole. The film assembly is detachably mounted within the first mounting hole. The first condensing lens is provided on the illuminating surface of the first non-coherent light source. The film sheet is provided on the other side of the first condensing lens relative to the first non-coherent light source. The imaging assembly is provided on the other side of the film sheet relative to the first condensing lens. The imaging assembly includes a lens. The lens is configured to collect a light spot of an effective pattern passing through the film sheet, thus forming a real image pattern projected onto a light-shadow bearing surface. When the film assembly is mounted into the first mounting hole, the identifying module identifies the electronic label on the film sheet, then positions an audio corresponding to the electronic label in the storage medium and plays the audio via a speaker, so that the galactic starry sky pattern projected by the projecting apparatus is combined with the audio. A user changes different film sheets and still can hear the audio corresponding to the pattern of the film sheet, thus improving the user's experience and the practicality of the projecting apparatus.

BRIEF DESCRIPTION OF THE DRAWINGS

In order to explain embodiments of the utility model or the technical solutions in the prior art more clearly, the following briefly introduces the drawings that need to be used in the description of the embodiments or the prior art. Obviously, the drawings in the following description are only some of the embodiments of the utility model. The person skilled in the art may obtain other drawings based on structures shown in these drawings without creative labor.

The description of reference signs:

| Reference sign | Name |
| --- | --- |
| 10 | First housing |
| 11 | First mounting hole |
| 21 | First incoherent light source |
| 22 | First condensing lens |
| 23 | Second condensing lens |
| 24 | Second sleeve tube |
| 31 | Control board |
| 32 | Electronic label |
| 33 | Speaker |
| 41 | Imaging lens |
| 42 | Adjusting lens |
| 43 | Wide-angle lens |
| 44 | First sleeve tube |
| 70 | Bracket |
| 65 | Second driving gear |

-continued

| Reference sign | Name |
| --- | --- |
| 66 | Rotating shaft |
| 51 | Film sheet |
| 521 | Upper housing |
| 522 | Lower housing |
| 53 | Film tray |
| 531 | Mounting groove |
| 532 | Position-avoidance groove |
| 54 | Limiting ring |
| 55 | Rotating board |
| 551 | Fixing groove |
| 552 | Annular groove |
| 56 | Pressing board |
| 61 | Motor |
| 62 | Fixing board |
| 63 | Driving gear |
| 64 | First transmission gear |

The realization, functional characteristics and advantages of the objective of the utility model will be further described with reference to the drawings in conjunction with the embodiments.

DETAILED DESCRIPTION OF EMBODIMENTS

The following clearly and completely describes the technical solutions in embodiments of the utility model in conjunction with the drawings in the embodiments of the utility model. Obviously, the described embodiments are only a part of the embodiments of the utility model, rather than all embodiments. Based on the embodiments of the utility model, all other embodiments obtained by the person skilled in the art without creative labor shall fall within the protection scope of the utility model.

It should be noted that if the embodiments of the utility model involve directional indications (such as up, down, left, right, front, back . . . ), the directional indications are only used to explain a relative position relationship and movement among various components under a certain posture (as shown in the accompanying drawings). If a specific posture changes, the directional indication also changes accordingly.

In addition, if there are descriptions of terms such as "first", "second" and the like in the embodiments of the utility model, the descriptions of the terms such as "first", "second" and the like are merely intended for a purpose of description, and shall not be understood as an indication or implication of relative importance or implicit indication of a quantity of indicated technical features. Therefore, the features defined with "first" and "second" can explicitly or implicitly include at least one of the features. In addition, the meaning of "and/or" in the whole text is to include three parallel schemes. Taking "A and/or B" as an example, "A and/or B" includes scheme A, scheme B, or a scheme that A and B are satisfied at the same time. In addition, the technical solutions among the various embodiments may be combined with each other, but should be based on what may be achieved by the person skilled in the art. When a combination of technical solutions is contradictory or cannot be achieved, it should be considered that such a combination of technical solutions does not exist, and also does not fall within the scope of protection required by the utility model.

The utility model proposes a pattern projecting apparatus for automatically identifying and playing an audio.

Figure 1:
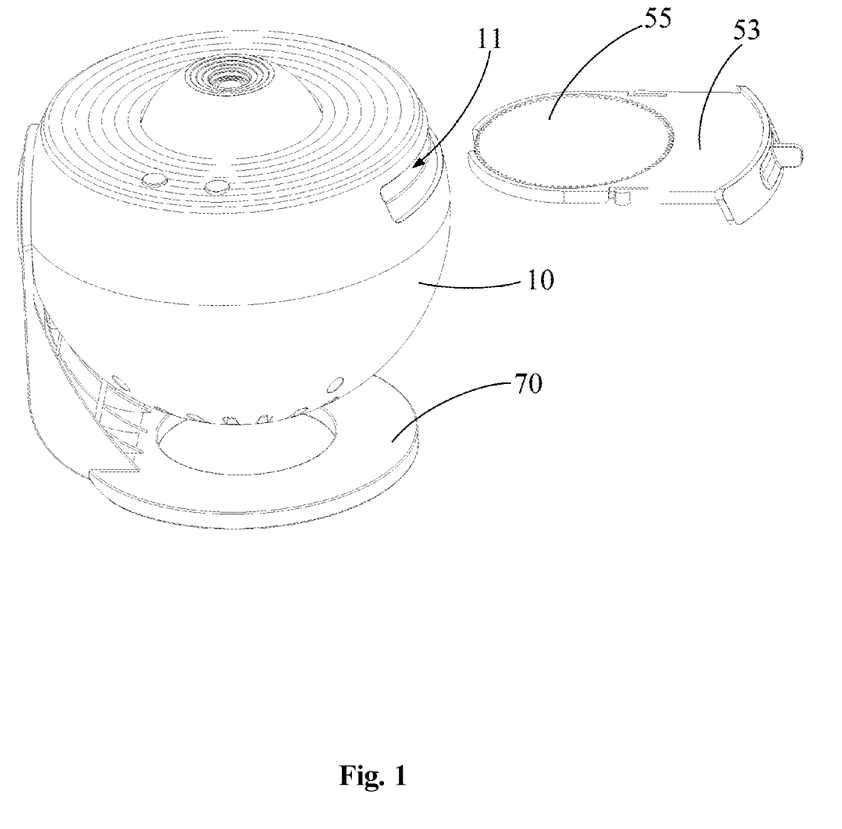
FIG. 1 is a schematic structural diagram of a projecting apparatus of the utility model.
Figure 2:
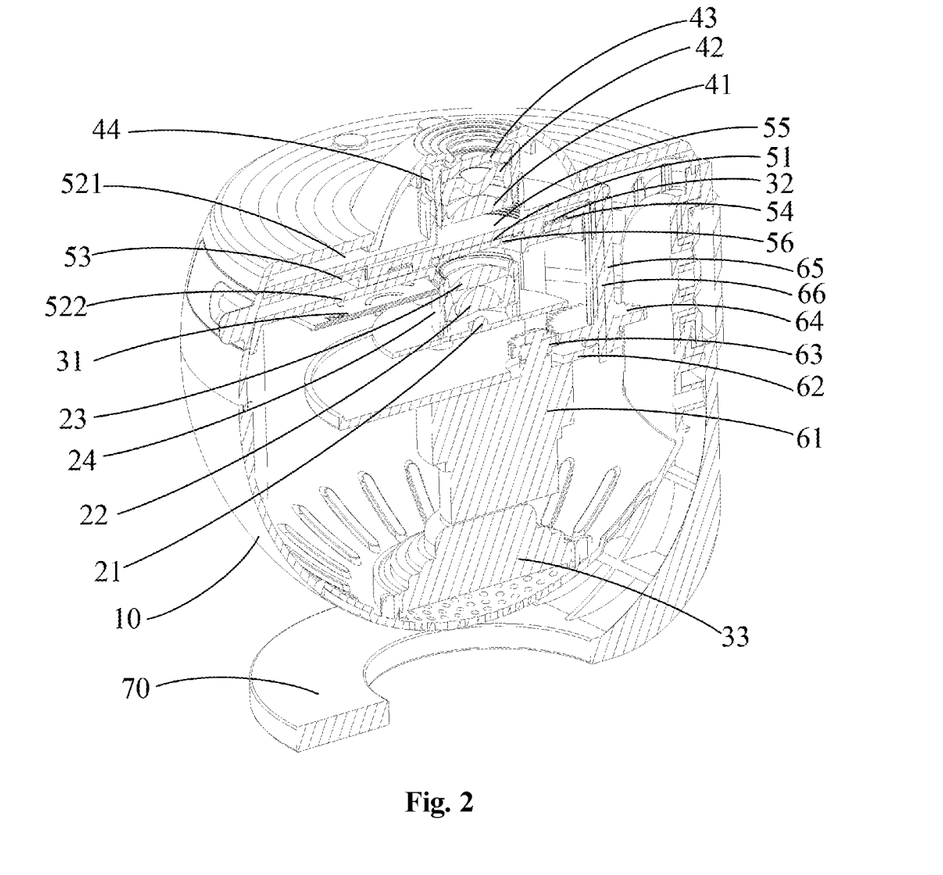
FIG. 2 is a cross-sectional diagram of a projecting apparatus of the utility model.
Figure 3:
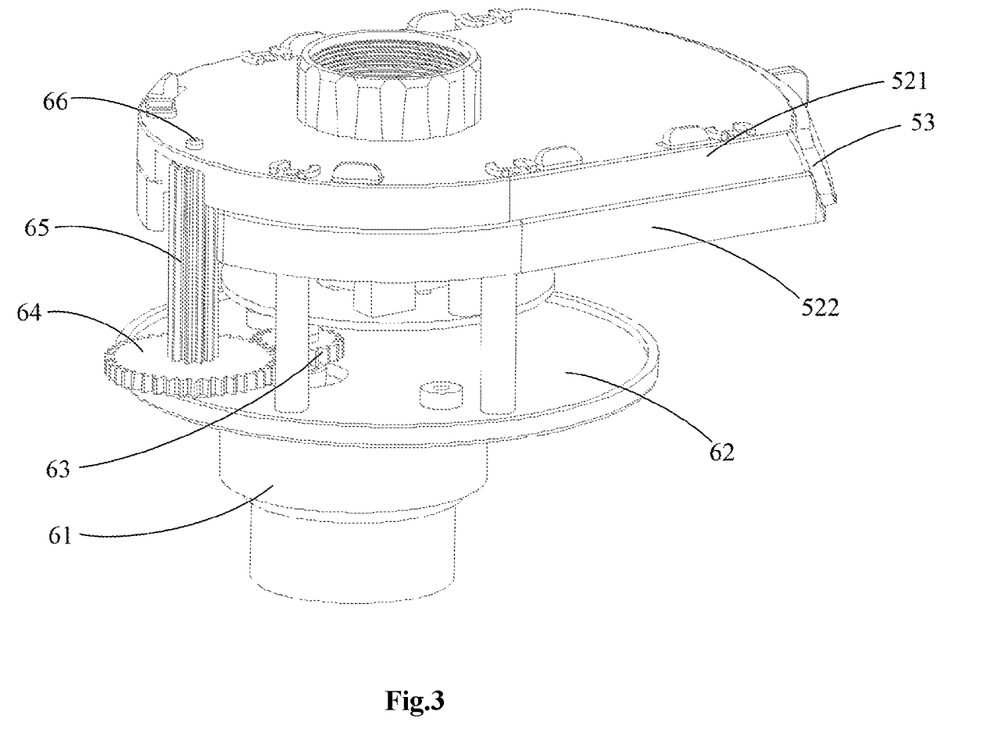
FIG. 3 is a schematic structural diagram of a light-emitting assembly, a film assembly and an audio assembly.
Figure 4:
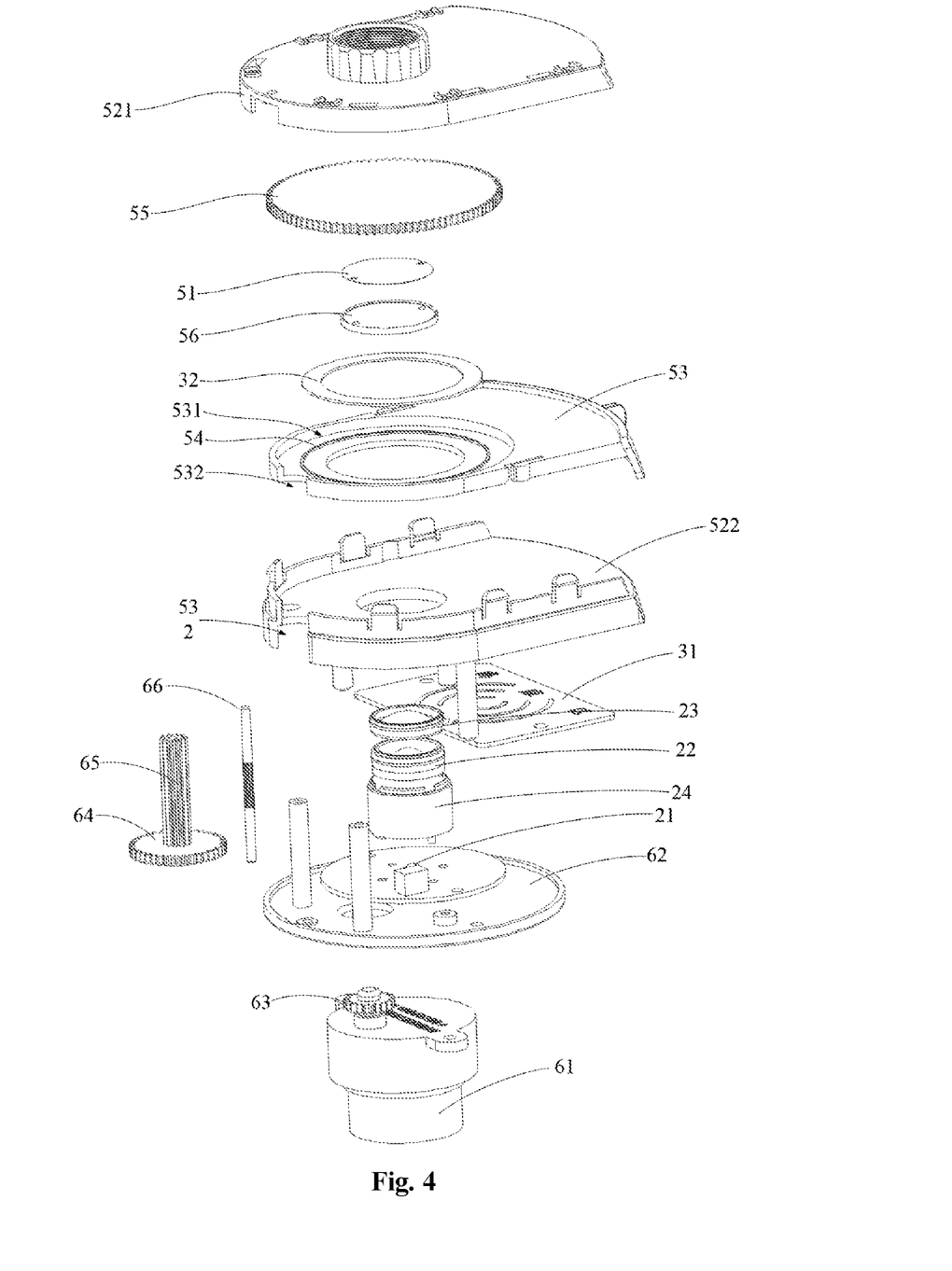
FIG. 4 is a schematic structural diagram of a light-emitting assembly, a film assembly, and an audio assembly in an angle under a decomposition state.
Figure 5:
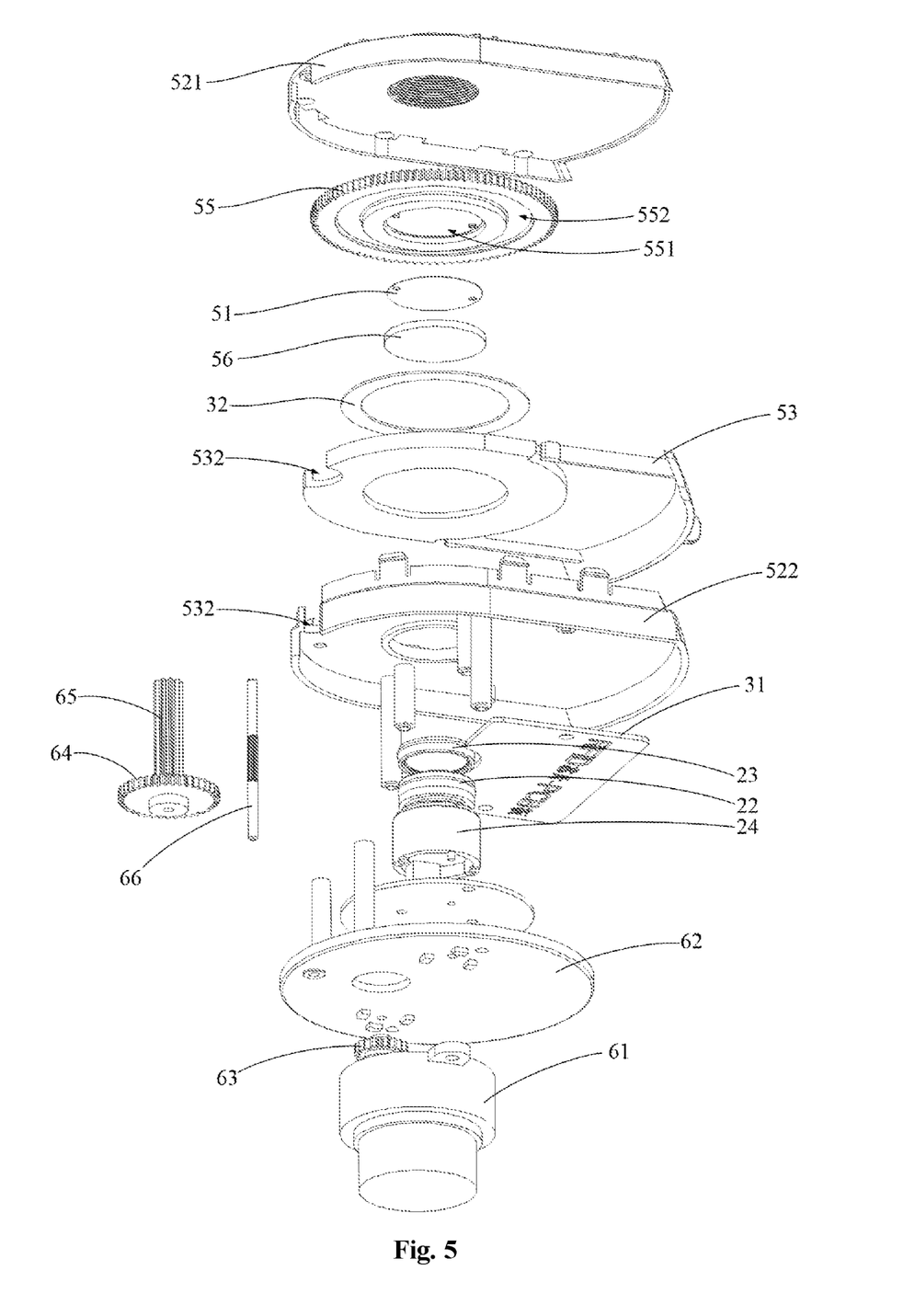
FIG. 5 is a schematic structural diagram of a light-emitting assembly, a film assembly, and an audio assembly in another angle under a decomposition state.

In an embodiment of the utility model, as shown in FIGS. 1 to 5, the projecting apparatus includes a first housing 10 opened and provided with a first mounting hole 11;

a light-emitting assembly arranged within the first housing 10, the light-emitting assembly includes at least one first incoherent light source 21 and at least one first condensing lens 22, and the first condensing lens 22 is arranged on the illuminating surface of the first incoherent light source 21;

a film assembly detachably arranged within the first mounting hole 11, the film assembly includes a film sheet 51 provided with a galactic starry sky pattern, and the film sheet 51 is arranged on the other side of the first condensing lens 22 relative to the first incoherent light source 21;

an audio assembly including a control board 31, an electronic label 32 corresponding to the film sheet 51, an identifying module for identifying the electronic label 32 and arranged on the control board 31, a storage medium pre-stored with an audio corresponding to a galactic starry sky pattern and a speaker 33 electrically connected to the control board 31, the electronic label 32 is arranged on the film assembly, and the control board 31, the storage medium, and the speaker 33 are arranged within the first housing 10; and an imaging assembly arranged within the first housing 10 and including at least one lens, the lens is arranged on the other side of the film sheet 51 relative to the first condensing lens 22.

In this embodiment, the first housing 10 is a shell of the projecting apparatus for protecting the other components of the projecting apparatus and for providing a mounting position for the other components of the projecting apparatus. The first housing 10 is opened and provided thereon with a first mounting hole 11. The first mounting hole 11 is configured to mount the film assembly.

The light-emitting assembly is a light source component of the projecting apparatus. The first incoherent light source 21 is a light-emitting member of the projecting apparatus, and is configured to illuminate and project a pattern onto a light-shadow bearing surface. The plurality of first incoherent light sources 21 can be arranged to improve the intensity of a light ray. The first condensing lens 22 is configured to focus a light ray emitted by the first incoherent light source 21 to improve the intensity of the light ray, and is arranged on the illuminating surface of the first incoherent light source 21.

The film assembly is a pattern-bearing assembly of the projecting apparatus. The film assembly is detachably arranged in the first mounting hole 11. The film sheet 51 is a pattern-bearing member of the projecting apparatus. The film sheet 51 is provided with a pattern similar to the galactic starry sky. The film sheet 51 is provided on the other side of the first condensing lens 22 relative to the first incoherent light source 21. Therefore, when projecting a focused light onto the film sheet 51, the first condensing lens 22 maps the galactic starry sky pattern onto the light-shadow bearing surface, so as to present a galaxy starry lighting effect on the light-shadow bearing surface.

The audio assembly is configured to automatically identify the electronic label 32 on the film sheet 51, so as to automatically play the audio corresponding to the galactic starry sky on the film sheet 51. Specifically, the film sheet 51 is provided thereon with the electronic label 32. The electronic label 32 is configured to number the film sheet 51. Specifically, the electronic label can be an RFID label, an IC induction label, or a bar code label, without limitation herein. When the film assembly is mounted into the first mounting hole 11, the identifying module automatically identifies the number on the electronic label 32, and then generates an electrical signal forward the control board 31. The control board 31 positions the corresponding audio in the storage medium according to electrical signals and plays the audio via the speaker 33.

The imaging assembly is configured to process a pattern spot passing through the film sheet 51 to render the pattern on the film sheet 51 clearly and completely on the light-shadow bearing surface. The imaging assembly includes at least one lens, of which the number is increased or decreased depending on a use scenario of the projecting apparatus, without limitation herein.

It should be explained that the first incoherent light source 21, the first condensing lens 22, the film sheet 51, and a lens of the imaging assembly are all arranged coaxially, so that the loss of the light ray emitted by the first incoherent light source 21 can be effectively reduced, thereby improving the brightness of a pattern projected by the projecting apparatus.

Based on the technical solution of the utility model, the light-emitting assembly is arranged in the first housing 10. The first housing 10 is opened and provided thereon with a first mounting hole 11. The film assembly is detachably mounted within the first mounting hole 11. The first condensing lens 22 is provided on the illuminating surface of the first non-coherent light source 21. The film sheet 51 is provided on the other side of the first condensing lens 22 relative to the first non-coherent light source 21. The imaging assembly is provided on the other side of the film sheet 51 relative to the first condensing lens 22. The imaging assembly includes a lens. The lens is configured to collect a light spot of an effective pattern passing through the film sheet 51, thus forming a real image pattern projected onto the light-shadow bearing surface. When the film assembly is mounted into the first mounting hole 11, the identifying module identifies the electronic label 32 on the film sheet 51, then positions an audio corresponding to the electronic label 32 in the storage medium and plays the audio via a speaker 33, so that the galactic starry sky pattern projected by the projecting apparatus is combined with the audio. A user changes different film sheets 51 and still can hear the audio corresponding to the pattern of the film sheet 51, thus improving the user's experience and the practicality of the projecting apparatus.

Further, as shown in FIGS. 1 to 5, the electronic label 32 is an RFID label, and the identifying module includes an RFID chip. In this embodiment, the electronic label 32 is preferably the RFID label. RFID is a radio frequency identification technology. Compared to IC induction or a bar code label, the RFID is waterproof, anti-magnetic, high-temperature resistant, has long service life, long read distance and other characteristics. In addition, the identifying module includes the RFID chip for sensing the data on the RFID label.

Further, as shown in FIGS. 1-5, the film assembly includes a second housing and a film tray 53. The film sheet 51 is arranged on the film tray 53. The position of the second housing corresponding to the first mounting hole 11 is fixed in the first housing 10. The film tray 53 is inserted and provided in the first mounting hole 11 and extends into the second housing. In this embodiment, the second housing is configured to provide the film tray 53 with a movable mounting position. Specifically, the second housing is fixed in the first housing 10 and arranged at the position corresponding to the first mounting hole 11. The film tray 53 can be movably inserted and provided into the second housing via the first mounting hole 11 so that the user can change the film sheet 51 at any time according to the use scenario. Therefore, the projecting apparatus is suitable for more scenarios, thus effectively improving the practicality of the projecting apparatus.

It should be explained that when the film tray 53 is inserted and provided into the second housing. A light-transmitting hole is arranged at the position of the second housing corresponding to the film tray 51, so that the light ray reflected by the first condensing lens 22 can accurately illuminate onto the film tray 51.

In addition, the control board 31 is fixed at the bottom of the second housing, so that the control board 31 more effectively senses the electronic label 32 on the film sheet 51. Therefore, the identifying module has more accurate identification.

Further, as shown in FIGS. 1-5, the film assembly further includes a rotating board 55 and a pressing board 56. The rotating board is 55 opened and provided with a fixing groove 551. The film sheet 51 and the pressing board 56 are fixedly arranged in the fixing groove 551. The rotating board 55 and the pressing board 56 are made of a transparent material. The film tray 53 is opened and provided thereon with a mounting groove 531. The rotating board 55 is arranged within the mounting groove 531. In this embodiment, the rotating board 55 and the pressing board 56 are configured to fix the film sheet 51. Specifically, the film sheet 51 is arranged in the fixing groove 551. The pressing board 56 is arranged on the film sheet 51. The pressing board 56 and the rotating board 55 are packaged via a press-fitting process, thereby preventing the film sheet 51 from contacting with air, preventing the pattern on the film sheet 51 from being oxidized, thus effectively improving a service life of the film sheet 51.

The mounting groove 531 is arranged by corresponding to a position of the first condensing lens 22. The rotating board 55 is arranged in the mounting groove 531. Therefore, a projection effect of the projecting lamp can be effectively avoided from being affected because the film sheet 51 does not correspond to a first condensing projection due to a mistaken installation of the rotating board 55. The mounting groove 531 is opened and provided with a light transmission hole at the position of the film sheet 51 so that the light reflected by the first condensing lens 22 can accurately illuminate onto the film 51.

It should be explained that the rotating board 55 and the pressing board 56 are made of the transparent material, so that the light ray can pass through the rotating board 55 and the pressing board 56 to project the pattern on the film sheet 51 out.

In addition, a positioning column is arranged in the fixing groove 551. The film sheet 51 and the pressing board 56 are opened and provided thereon with a positioning hole cooperating with the fixing column, thereby effectively improving the assembly efficiency of the film assembly.

Further, as shown in FIGS. 1-5, the electronic label 32 is provided as an annular shape. The rotating board 55 is opened and provided with an annular groove 552. The electronic label 32 is arranged within the annular groove 552. The film sheet 51 is positioned in the middle of the electronic label 32. In this embodiment, the identifying module has an automatic induction area. The electronic label 32 is arranged as the annular shape so that the electronic label 32 is always in the automatic induction area in a rotation process, thereby improving the stability of the automatic induction of the identifying module.

Further, as shown in FIGS. 1-5, the projecting apparatus further includes a first driving assembly arranged in a mounting casing. The first driving assembly includes a motor 61, a fixing board 62, and a gear set. The fixing board 62 is fixed within the first housing 10. The motor 61 is fixed on the fixing board 62. The sidewall of the rotating board 55 is arranged in a tooth shape meshing with the gear set so that the motor 61 drives the rotating board 55 via the gear set to rotate. In this embodiment, the first driving assembly is configured to drive the rotating board 55 to rotate, so that the light effect of the galactic starry sky projected by the projecting apparatus becomes dynamic, thereby diversifying the light effect projected by the projecting apparatus. Specifically, the fixing board 62 is arranged within the first housing 10 for fixing the motor 61. The gear set is arranged on the motor 61. Additionally, the sidewall of the rotating board 55 is arranged as a tooth shape. The motor 61 drives the rotating board 55 via the gear set to rotate, thereby forming a dynamic lighting effect.

Further, the first driving assembly is arranged below the first incoherent light source 21. The first driving assembly further includes a rotating shaft 66 of which one end is fixed on the fixing board 62 and of which the other end is fixed on the second housing. The gear set includes a driving gear 63 arranged on a motor shaft of the motor 61, a first transmission gear 64 sleeved on a rotating shaft 66 and meshed with the driving gear 63, and a second transmission gear 65 sleeved on the rotating shaft 66 and fixedly connected to the first transmission gear 64. The second transmission gear 65 is meshed with the rotating board 55. The second transmission gear 65 has the number of teeth less than that of the first transmission gear 64. In this embodiment, the first driving assembly can be arranged on the peripheral side of the first incoherent light source 21, or can be arranged below the first incoherent light source 21. Preferably, the first driving assembly is arranged below the first incoherent light source 21, thereby effectively reducing the occupied area of the projecting apparatus and thus saving a space. The second transmission gear 65 has the number of teeth less than that of the first transmission gear 64, so that the second transmission gear 65 has a smaller transmission ratio. Additionally, the rotating board 55 has the number of teeth more than that of the second transmission gear 65, so that the second transmission gear drives the rotating board 55 to rotate at a very slow speed, which is closer to the effect of actual rotation of a starry sky. This can effectively improve the user's experience.

Further, the second housing includes an upper housing 521 and a lower housing 522. The film tray 53 and the lower housing 522 are opened and provided with a position-avoidance groove 532 for avoiding the position of the second transmission gear 65. The rotating shaft 66 passes through the position-avoidance groove 532 and is fixed on the upper housing 521. The bottom wall of the mounting groove 531 is provided with a limiting ring 54 correspondingly provided with the annular groove 552. In this embodiment, the upper housing 521 is snap-connected to the lower housing 522 to form a mounting space for mounting the film tray 53. The lower housing 522 and the film tray 53 are provided with the position-avoidance groove 532 for maintaining the second transmission gear 65 and the rotating board 55 to be effectively meshed. The limiting ring 54 cooperates with the annular groove 552 to prevent the rotating board 55 from being moved in a horizontal direction during rotation, which may cause the pattern projected by projecting apparatus to be shaken, and hence affect the projection effect. Therefore, this effectively improves the practicality of the projecting apparatus.

Further, as shown in FIGS. 1 to 5, the imaging assembly includes an imaging lens 41, an adjusting lens 42, and a wide-angle lens 43 arranged sequentially in a projecting direction of the film sheet 51, respectively. In this embodiment, the imaging lens 41 is configured to collect the light spots of the effective pattern passing through the film sheet 51, thereby forming the real image pattern to be projected onto the adjusting lens 42. The adjusting lens 42 is configured to reform, correct and project a real image onto the wide-angle lens 43. The wide-angle lens 43 is configured to magnify and project the adjusted real image pattern onto the light-shadow bearing surface, thereby exhibiting the clearly enlarged pattern effect on the light-shadow bearing surface. The plurality of lens with different functions are arranged, thereby effectively improving the clarity of the pattern projected by the projecting apparatus, and effectively improving the practicality of the projecting apparatus.

Further, the imaging assembly includes a first sleeve tube 44. The imaging lens 41, the adjusting lens 42, and the wide-angle lens 43 are arranged within the first sleeve tube 44. In this embodiment, the first sleeve tube 44 is configured to fix the imaging lens 41, the adjusting lens 42, and the wide-angle lens 43 so that the imaging lens 41, the adjusting lens 42, and the wide-angle lens 43 are always on the same axis. Therefore, a change in a relative position of the imaging lens 41, the adjusting lens 42, or the wide-angle lens 43 is avoided when the projecting apparatus is subjected to an external force, which further affects the projecting effect of the projecting apparatus. This thus effectively improves the structural stability of the projecting apparatus.

In addition, the imaging lens 41, the adjusting lens 42 and the wide-angle lens 43 are aspherical lenses. First abutting bosses are arranged on the sides of the imaging lens 41, the adjusting lens 42, and the wide-angle lens 43. The first abutting boss has a height greater than a thickness of a middle of each of the lenses, thereby effectively preventing each of the lenses from having friction or collision within the first sleeve tube 44, which affects the projecting effect of the projecting apparatus.

The bottom of the first sleeve tube 44 is also provided with an abutting member for abutting against the imaging lens 41. The abutting member is provided with a bearing boss. The abutting member is fixed to the first sleeve tube 44 for abutment, and the bearing boss is positioned within the first sleeve tube 44 to bear the imaging lens 41, thereby preventing a bearing lens from slipping out of the first sleeve tube 44.

Further, as shown in FIGS. 1-5, the light-emitting assembly further includes a second condensing lens 23. The second condensing lens 23 is arranged on the other side of the first condensing lens 22 relative to the first incoherent light source 21. In this embodiment, the first condensing lens 22 is configured to converge the light ray emitted by the first incoherent light source 21 to improve the intensity of the light ray. The second condensing lens 23 is arranged on the other side of the first condensing lens 22 relative to the first incoherent light source 21, and is configured to refract the light ray converged by the first condensing lens 22 again to uniformly project the light ray onto the film sheet 51, so as to avoid that the pattern on the film sheet 51 differs locally in shades due to the different intensities of the light ray, which affects the projecting effect of the projecting apparatus. Therefore, this effectively improves the practicality of the projecting apparatus.

Further, the light-emitting assembly further includes a second sleeve tube 24 arranged on the first incoherent light source 21. The first condensing lens 22 and the second condensing lens 23 are arranged within the second sleeve tube 24. Both of the first condensing lens 22 and the second condensing lens 23 are aspherical lenses. Second abutting bosses are arranged on the sides of the first condensing lens 22 and the second condensing lens 23. The second abutting boss has a height greater than a thickness of middles of the first condensing lens 22 and the second condensing lens 23.

Further, the projecting apparatus further includes a laser assembly. The laser assembly includes at least one coherent light source, at least one diffraction medium, and a second driving assembly for driving the diffraction medium to rotate. The diffraction medium is arranged on the illuminating surface of the coherent light source. In an embodiment, the laser assembly is configured to project another light effects. Specifically, the diffraction medium is arranged on the illuminating surface of the coherent light source. When the light ray emitted by the coherent light source passes through the diffraction medium, a light effect similar to stars is exhibited on the bearing surface of the light source. Additionally, the second driving assembly drives the diffraction medium to rotate, so that the light effect similar to stars appears as a dynamically moving light effect of the starry sky, thus effectively improving the light effect diversity of the projecting apparatus.

Further, as shown in FIGS. 1-5, the projecting apparatus for automatically identifying and playing the audio further includes a bracket 70. The first housing 10 is rotatably connected to the bracket 70. In this embodiment, the bracket 70 is configured to support the first housing 10. The first housing is rotatably connected to the bracket 70 via a rotating assembly, so that the user can conveniently adjust a projecting angle of the projecting apparatus, which effectively improves the practicality of the projecting apparatus.

The forgoing is only a preferred embodiment of the utility model, and is not intended to limit the patent scope of the utility model. Under the inventive concept of the utility model, an equivalent structure variation made by using the contents of the description and drawings of the utility model or direct/indirect use of the utility model in other related arts is included in the scope of patent protection of the utility model.

The invention claimed is:

1. A pattern projecting apparatus for automatically identifying and playing an audio, comprising:
a first housing opened and provided with a first mounting hole;
a light-emitting assembly arranged within the first housing, the light-emitting assembly comprises at least one first incoherent light source and at least one first condensing lens, and the first condensing lens is arranged on an illuminating surface of the first incoherent light source;
a film assembly detachably arranged within the first mounting hole, the film assembly comprises a film sheet provided with a galactic starry sky pattern, and the film sheet is arranged on the other side of the first condensing lens relative to the first incoherent light source;
an audio assembly comprising a control board, an electronic label corresponding to the film sheet, an identifying module for identifying the electronic label and arranged on the control board, a storage medium pre-stored with an audio corresponding to a galactic starry sky pattern, and a speaker electrically connected to the control board, the electronic label is arranged on the film assembly, and the control board, the storage medium, and the speaker are arranged within the first housing; and an imaging assembly arranged in the first housing and comprising at least one lens, the lens is arranged on the other side of the film sheet relative to the first condensing lens.

2. The pattern projecting apparatus for automatically identifying and playing the audio according to claim 1, wherein the film assembly comprises a second housing and a film tray, the film sheet is arranged on the film tray, a position of the second housing corresponding to the first mounting hole is fixed in the first housing, and the film tray is inserted and provided in the first mounting hole and extends into the second housing.

3. The pattern projecting apparatus for automatically identifying and playing the audio according to claim 2, wherein the control board is fixed at a bottom of the second housing.

4. The pattern projecting apparatus for automatically identifying and playing the audio according to claim 3, wherein the film assembly further comprises a rotating board and a pressing board, the rotating board is opened and provided with a fixing groove, the film sheet and the pressing board are fixedly arranged within the fixing groove, the rotating board and the pressing board are made of a transparent material, the film tray is opened and provided thereon with a mounting groove, and the rotating board is arranged within the mounting groove.

5. The pattern projecting apparatus for automatically identifying and playing the audio according to claim 4, wherein the electronic label is provided as an annular shape, the rotating board is opened and provided with an annular groove, the electronic label is arranged within the annular groove, and the film sheet is positioned in the middle of the electronic label.

6. The pattern projecting apparatus for automatically identifying and playing the audio according to claim 5, wherein the projecting apparatus further comprises a first driving assembly arranged in the first housing, the first driving assembly comprises a motor, a fixing board, and a gear set, the fixing board is fixed within the first housing, the motor is fixed on the fixing board, and a sidewall of the rotating board is arranged as a tooth shape that meshes with the gear set so that the motor drives the rotating board via the gear set to rotate.

7. The pattern projecting apparatus for automatically identifying and playing the audio according to claim 6, wherein the first driving assembly is arranged below the first incoherent light source, the first driving assembly further comprises a rotating shaft of which one end is fixed on the fixing board and of which the other end is fixed on the second housing, the gear set comprises a driving gear arranged on a motor shaft of the motor, a first transmission gear sleeved on a fixing column and meshed with the driving gear, and a second transmission gear sleeved on the fixing column and fixedly connected to the first transmission gear, the second transmission gear is meshed with the rotating board, and the second transmission gear has the number of teeth less than that of the first transmission gear.

8. The pattern projecting apparatus for automatically identifying and playing the audio according to claim 7, wherein the second housing comprises an upper housing and a lower housing, the film tray and the lower housing are opened and provided with a position-avoidance groove for avoiding a position of the second transmission gear, and the fixing column passes through the position-avoidance groove and is fixed on the upper housing;

a bottom wall of the mounting groove is provided with a limit ring correspondingly provided with the annular groove.

9. The pattern projecting apparatus for automatically identifying and playing the audio according to claim 1, wherein the imaging assembly comprises an imaging lens, an adjusting lens, and a wide-angle lens arranged sequentially in a projecting direction of the film sheet, respectively.

10. The pattern projecting apparatus for automatically identifying and playing the audio according to claim 9, wherein the imaging assembly comprises a first sleeve tube, and the imaging lens, the adjusting lens, and the wide-angle lens are arranged within the first sleeve tube.

11. The pattern projecting apparatus for automatically identifying and playing the audio according to claim 1, wherein the light-emitting assembly further comprises a second condensing lens, and the second condensing lens is arranged on the other side of the first condensing lens relative to the first incoherent light source.

12. The pattern projecting apparatus for automatically identifying and playing the audio according to claim 11, wherein the light-emitting assembly further comprises a second sleeve tube, the second sleeve tube is sleeved on the first incoherent light source, and the first condensing lens and the second condensing lens are arranged within the second sleeve tube.

13. The pattern projecting apparatus for automatically identifying and playing the audio according to claim 1, wherein the electronic label is an RFID label, and the identifying module comprises an RFID chip.

14. The pattern projecting apparatus for automatically identifying and playing the audio according to claim 1, wherein the first incoherent light source, the first condensing lens, the film sheet, and the imaging assembly are arranged coaxially.

15. The pattern projecting apparatus for automatically identifying and playing the audio according to claim 1, wherein the electronic label is an NFC label, and the identifying module comprises an NFC chip.

16. The pattern projecting apparatus for automatically identifying and playing the audio according to claim 1, further comprising a laser assembly, the laser assembly comprises at least one coherent light source, at least one diffraction medium, and a second driving assembly for driving the diffraction medium to rotate, and the diffraction medium is arranged on an illuminating surface of the coherent light source.

* * * * *